United States Patent [19]
Steinberg et al.

[11] Patent Number: 5,449,227
[45] Date of Patent: Sep. 12, 1995

[54] SOLENOID ATTACHMENT FOR ANTILOCK BRAKE SYSTEM

[75] Inventors: Stephen R. Steinberg, Brighton; Sim Vibora, Royal Oak, both of Mich.; James P. Golden, Santa Clara, Calif.

[73] Assignee: Ford Motor Company, Dearborn, Mich.

[21] Appl. No.: 272,062

[22] Filed: Jul. 8, 1994

[51] Int. Cl.$^6$ ............................................. B60T 8/32
[52] U.S. Cl. ............................ 303/119.2; 251/129.15; 335/278
[58] Field of Search ............... 303/119.2, 119.1, 113.1; 251/129.15, 129.01; 137/884, 596.17, 343; 439/34, 13; 335/278, 202, 260, 281

[56] References Cited

U.S. PATENT DOCUMENTS

| | | |
|---|---|---|
| 4,393,994 | 7/1983 | Rieck . |
| 4,626,813 | 12/1986 | Koga et al. . |
| 4,647,008 | 3/1987 | Shirai et al. . |
| 4,785,848 | 11/1988 | Leiber . |
| 4,836,248 | 6/1989 | Stegmaier . |
| 4,842,010 | 6/1989 | Edgecomb et al. . |
| 4,882,558 | 11/1989 | Takayanagi . |
| 4,898,360 | 2/1990 | VonHayn et al. . |
| 4,929,038 | 5/1990 | Reihartz et al. ................. 303/119.2 |
| 5,040,853 | 8/1991 | Burgdorf et al. . |
| 5,145,149 | 9/1992 | Moehle . |
| 5,362,141 | 11/1994 | Beck et al. ........................ 303/119.2 |

FOREIGN PATENT DOCUMENTS 2225168 10/1989 United Kingdom .

*Primary Examiner*—Douglas C. Butler
*Attorney, Agent, or Firm*—Donald A. Wilkinson; Roger L. May

[57] ABSTRACT

A solenoid attachment for a vehicle antilock brake system. The solenoid attachment includes a coil pack housing (10) having leadframes (12) electrically connecting to a circuit board (22) of the electronic control unit (24). The solenoid attachment also includes a plurality of solenoid assemblies (26). Each solenoid assembly (26) includes coil windings (48) and a bobbin (46) contained within a can (52). A retention ring (58), including retention snaps (60), is associated with each solenoid assembly (26) for removably retaining each solenoid assembly (26) in the coil pack housing (10). Each solenoid assembly (26) is further mounted to an elastomeric gasket (56) that both seals about an adjustment gap (53), open to the electronic circuit board (22), and biases the solenoid assembly (26) against its corresponding valve (40). A sealing mechanism (66, 98) is provided with each valve assembly (26) for sealing around an associated valve stem (42).

19 Claims, 4 Drawing Sheets

SOLENOID ATTACHMENT FOR ANTILOCK BRAKE SYSTEM

FIELD OF THE INVENTION

The present invention relates to solenoid coil assemblies and more particularly to the packaging of solenoid coil assemblies for use with an automotive antilock braking system.

BACKGROUND OF THE INVENTION

The state-of-the-art in antilock brake systems involves the integration of the electronic control assembly with the brake system's solenoid valve assemblies and hydraulic control unit. Some prior designs have solenoid valve assemblies press-fit onto valve stems in a separate hydraulic control unit. This assembly is, in turn, connected to an electronic controller via a wiring harness.

For an integral assembly, the solenoid assemblies must be assembled into the electronic assembly before being mated to hydraulic valve stems in order to form a magnetic interconnect. Because of this integration, it is no longer feasible to press-fit an assembly of solenoid assemblies onto the valve stems. Some adjustability or tolerance, which allows for motion of the individual solenoid assemblies relative to their respective valve stems, is needed so that tolerances between the locations of the valve stems can be accounted for. Also, a bias or force must be exerted by each solenoid assembly toward its respective valve to both insure a continuous magnetic path and to prevent rattling when the solenoid assemblies are actuated and when they are subjected to vehicle vibrations. Further, with an integrated system, there needs to be a seal between each of the solenoid assemblies and the electronic assembly to prevent moisture and other contaminants from entering the assembly.

Current integrated antilock brake systems typically account for tolerances and sealing of the electronics when forming the integrated assembly by having the solenoid assemblies secured using a potting compound. Typically, the solenoid assemblies are mechanically fixtured for alignment and then set into position and soldered directly to the circuit board of the electronics control unit, and an elastomeric potting compound is dispensed or injected around them and cured to secure them in place and seal the electronic assembly.

Using potting compound to align and secure the solenoid assemblies is not a preferred type of manufacturing process since the integrated assembly formed is both non-repairable and the cure oven process may emit regulated pollutants. Further, potting the solenoid assemblies requires special manufacturing fixturing and cure ovens. The potting compound also adds a considerable amount of weight to an assembly, which is undesirable.

The need exists, then, for easier manufacturing and assembly, producing a lighter weight integrated assembly, with lower environmental impact, while meeting all of the requirements of a repairable solenoid coil assembly for an integrated antilock braking system.

SUMMARY OF THE INVENTION

This invention avoids the problems associated with potting solenoid assemblies by providing a simple snap-in assembly procedure having all of the benefits of potting without all of the unwanted complications, and by providing a unique and innovative packaging concept for an integrated antilock braking system.

A self-contained solenoid assembly eliminates the need for sending solenoid assemblies through a solder oven, a potting cure oven, and other potential ovens in the electrical and hydraulic control units assembly processes. This reduces the need for oversized ovens that would also have to heat the mass of the solenoid assemblies, and reduces the need for a high temperature plastic for a solenoid coil housing that would be needed if it were to enter these ovens.

In its embodiments, the present invention contemplates a solenoid assembly coil pack for use in integrated electronics and hydraulics assemblies of an automotive antilock brake system. The solenoid assembly coil pack includes a coil pack housing provided with a plurality of generally cylindrical bores therethrough and an attachment means for securing the coil pack to the electronics assembly. Each bore includes a solenoid retaining member. The solenoid assembly coil pack also includes a plurality of solenoid assemblies, each adapted to receive a respective valve and valve stem of the hydraulics assembly and each received within a corresponding one of the cylindrical bores. Each solenoid assembly includes a pair of solenoid lead wires protruding therefrom. A plurality of retention rings are provided, with one of the rings cooperatively engaging each of the solenoid assemblies, and with each retention ring including retention means for removably engaging the retaining member to removably retain its corresponding solenoid assembly therein. A plurality of gaskets is provided, with one of the gaskets mounted between each of the coil pack housings and its corresponding solenoid assembly, and a sealing means is adapted for sealing between each coil assembly and associated valve stem of the hydraulics assembly. An electrical means electrically connects each of the solenoid lead wires of the solenoid assemblies to the electronics assembly.

Accordingly, an object of the present invention is to create an antilock brake system that integrates a hydraulic control unit and solenoid assemblies into an electronic assembly that is easy to assemble, water tight and provides a good magnetic path, while eliminating the need for the use of potting compound in this assembly.

An advantage of the present invention is a lighter weight assembly that is self aligning and thus easy to assemble. A further advantage of the present invention is the elimination of environmentally unfriendly processes used when manufacturing with potting compounds. A still further advantage of the present invention is a snap retention feature securing the assemblies together, yet still allowing for repairability of the solenoid coils and the overall solenoid coil assembly.

A further advantage of the present invention is that a coil pack for packaging the solenoid coil assemblies allows for a complete subassembly of the coil packaging itself while maintaining an integrated design, which eliminates significant manufacturing process steps and the need to precess the mass of the solenoid assemblies through the entire assembly line while assembling the electronic assembly and hydraulic control unit.

DETAILED DESCRIPTION OF THE PREFERRED EMBODIMENTS

Figure 1:
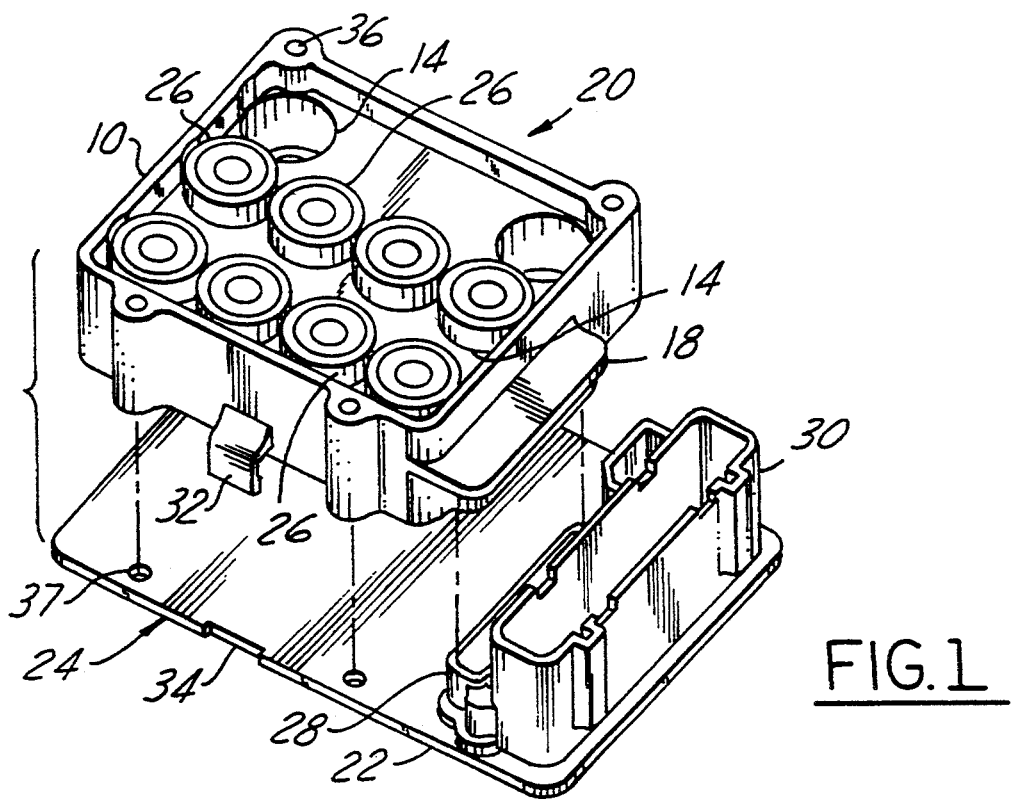
FIG. 1 is a partially exploded perspective view of a solenoid coil pack assembly as it mounts to a circuit board and connector.
Figure 2:
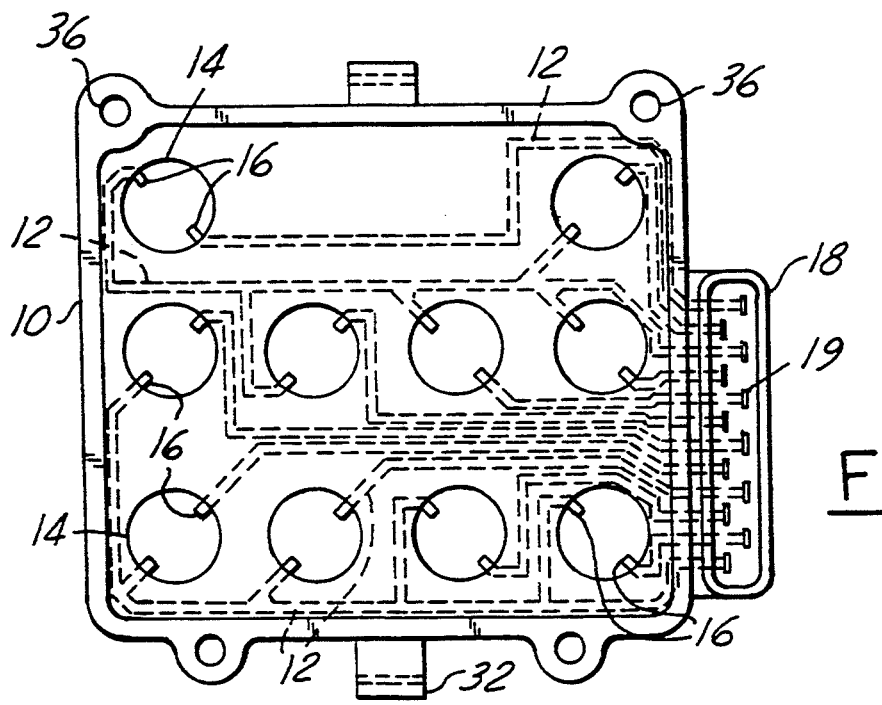
FIG. 2 is a bottom plan view of a coil pack housing with leadframes.
Figure 3:
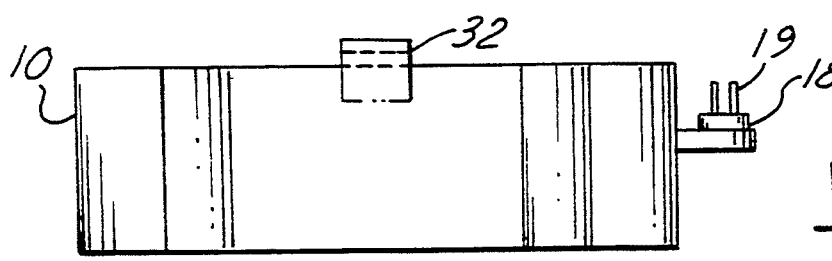
FIG. 3 is a side view of a coil pack housing.

FIGS. 1-5 illustrate the first embodiment of the present invention. FIGS. 2 and 3, in particular, show a coil pack housing 10 without solenoid assemblies inserted therein. Leadframes 12 are generally enclosed in the plastic molding of housing 10, preferably integral with housing 10 by using an insert molding process. Housing 10 includes a plurality of throughbores 14 for receiving solenoid assemblies. Leadframes 12 are located such that a pair of them terminate at each generally cylindrical throughbore 14, forming contact points 16 for each solenoid assembly. The opposite end of each leadframe 12 terminates inside a blade connector 18, with one pin 19 for each of the unique coil leads and one or more pins 19 for the common side of the coils. Blade connector 18 connects leadframes 12 into an electronic circuit, as shown in FIG. 1. In order to minimize the number of connections, leadframes 12 are substantially commonized on one side of the solenoid assemblies. This will reduce the number of electrical connections that need to be made to a circuit board.

Figure 4:
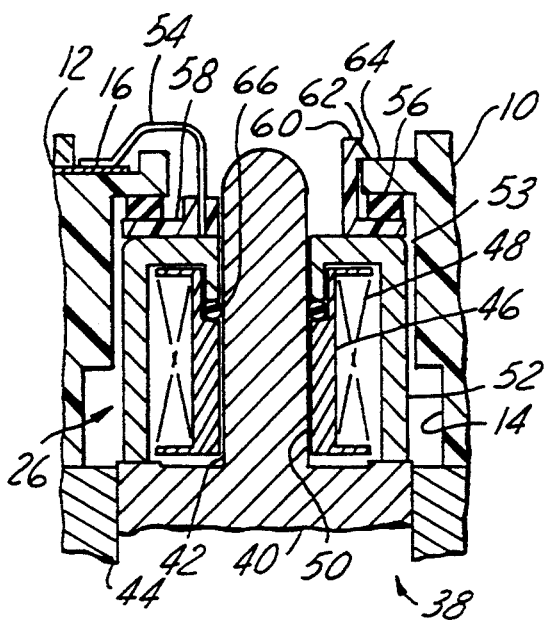
FIG. 4 is a sectional view taken generally along tines 4-4 in FIG. 5, showing a solenoid assembly in the coil pack along with a valve and valve block.

FIG. 1 illustrates a coil pack assembly 20 as it assembles onto a circuit board 22 of an integrated electronics assembly 24. Coil pack assembly 20 comprises a set of solenoid coil assemblies 26 removably inserted into cylindrical throughbores 14 in coil pack housing 10. Each solenoid assembly 26 is mounted in electrical contact with leadframes 12, as shown in FIGS. 2 and 4.

Electronics assembly 24 and coil pack assembly 20 are preferably assembled separately and then connected together. Circuit board 22 includes circuitry on its underside, not shown. Connected to the circuitry on circuit board 22 is a coil pack connector 28, which is integral with a main module connector 30 of electronic assembly 24. Coil pack connector 28 is soldered to circuit board 22 during normal processing of electronic assembly 24 and forms the mating half to blade connector 18. By using coil pack connector 28, all of the solenoid electrical connections are isolated to a small region of circuit board 22 rather than having coil leads connected all over the circuit board, which is preferable since it allows for greater circuit board utilization and layout flexibility.

After electronic assembly 24 and coil pack assembly 20 are assembled, coil pack assembly 20 is snapped onto circuit board 22, by engaging coil pack snap retainers 32, integral with and protruding from coil pack housing 10, about retention notches 34, in circuit board 22. As an option, coil pack assembly 20 can be bolted to circuit board 22 using bolts inserted through holes 36 in coil pack housing 10 and into holes 37 in circuit board 22. Blade connector 18 of coil pack assembly 20 plugs into coil pack connector 28, integrating the solenoid assemblies into the electronic circuit. By utilizing coil pack assembly 20, which allows for a complete and separate subassembly of solenoid assemblies 26 while maintaining an integrated design, the need to process the mass of solenoid assemblies 26 through the entire electronic circuit's assembly lines is eliminated. A hydraulic control unit 38, (shown in FIG. 4) is mounted to coil pack assembly 20, sandwiching coil pack assembly 20 between electronics assembly 24 and hydraulic control unit 38, which integrates hydraulic control unit 38 into electronics assembly 24.

This overall assembly provides for repairability if a problem develops with a solenoid assembly 26. An entire coil pack assembly 20 can be unsnapped from electronic assembly 24 and replaced with a new one, or a single solenoid assembly 26 can be replaced by unsnapping it after detaching its leads. In designs with potting material, the entire electronic module would have to be scrapped if a solenoid assembly develops a problem and needs to be replaced.

Figure 5:
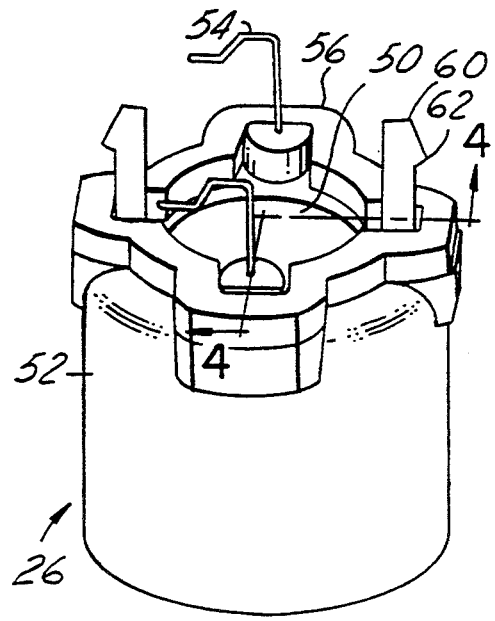
FIG. 5 is a perspective view of a solenoid assembly prior to insertion into a coil pack.

FIG. 4 illustrates a cross-section view through a solenoid assembly 26 as mounted into coil pack housing 10 and mounted to hydraulic control unit 38, and FIG. 5 illustrates a solenoid assembly 26 before insertion into coil pack housing 10. Hydraulic control unit 38 includes a series of valves 40 with valve stems 42, one for each solenoid assembly 26. Valve stem 42 extends down through the center of solenoid assembly 26. Valves 40 are retained in a valve block 44.

Solenoid assembly 26 includes a bobbin 46 with coil windings 48 wrapped around it and a hole 50 through the center of bobbin 46 for receiving a corresponding valve stem 42. Bobbin 46 and coil 48 are encapsulated and sealed within a metal can 52. Metal can 52 contains the magnetic flux inside. A gap 53 exists between can 52 and throughbore 14 for alignment of each solenoid assembly 26 to its corresponding valve stem 42. Gap 53 is designed to allow for enough side-to-side motion of each solenoid assembly 26 relative to housing 10 so that each solenoid assembly 26 can account for any manufacturing tolerances and properly align with its corresponding valve stem 42.

Bobbin 46 has two coil lead wires 54 that extend out through can 52. Leads 54 connect solenoid assembly 26 to leadframes 12. Each lead 54 is preferably wire welded to its corresponding leadframe 12, although other attachment methods such as soldering, resistance welding or direct plug-in are possible. The magnetic connection to valve block 44 is made by a circuit consisting of coil can 52, windings 48, valve stem 42, and valve 40.

Mounted to can 52 is a retention ring 58. Protruding from retention ring 58 are retention snaps 60, each having a barb 62 at its end. Each cylindrical throughbore 14 in coil pack housing 10 includes an annular retention wall 64 therein. Solenoid assembly 26 is inserted and then secured in place by barbs 62 snapping into place to engage retention wall 64.

An elastomeric or foam gasket 56 is mounted to retention ring 58. Elastomeric gasket 56 is compressed between solenoid assembly 26 and retention wall 64 of housing 10 when retention snaps 60 are engaging retention wall 64. Gasket 56 provides two required features. First, compressed gasket 56 creates a biasing force to hold solenoid assembly 26 against valve 40 to maintain a continuous magnetic flux path and to prevent rattle or vibration between the two. Second, it seals off around the perimeter of solenoid can 52 preventing moisture and other contaminants from passing through gap 53 to electronics circuit board 22.

Mounted in a groove between each bobbin 46 and can 52 is an O-ring 66. Each O-ring 66 is sized to receive a corresponding valve stem 42 and to seal between its corresponding valve stem 42 and hole 50. The O-rings 66 prevent contaminants from passing down through the center of the solenoid assembly along valve stems 42 and onto circuit board 22.

Figure 6:
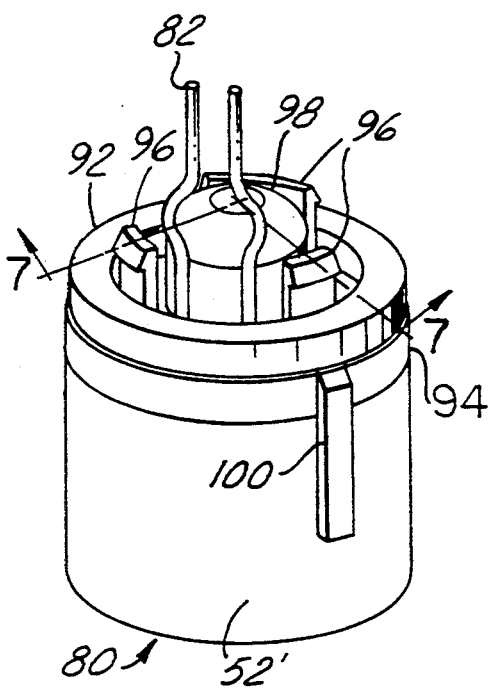
FIG. 6 is a perspective view similar to FIG. 4, showing a first alternate embodiment of the solenoid assembly.
Figure 7:
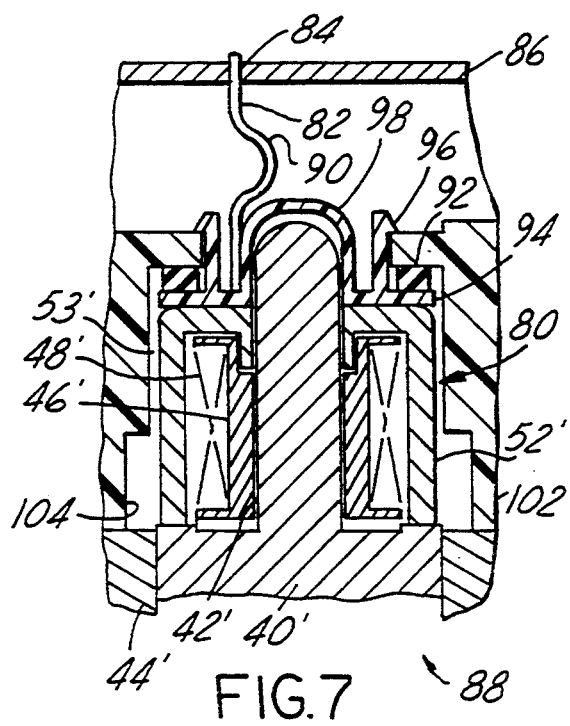
FIG. 7 is a cross sectional view similar to FIG. 4, taken generally along lines 7—7 in FIG. 6, showing the first alternate embodiment.
Figure 8:
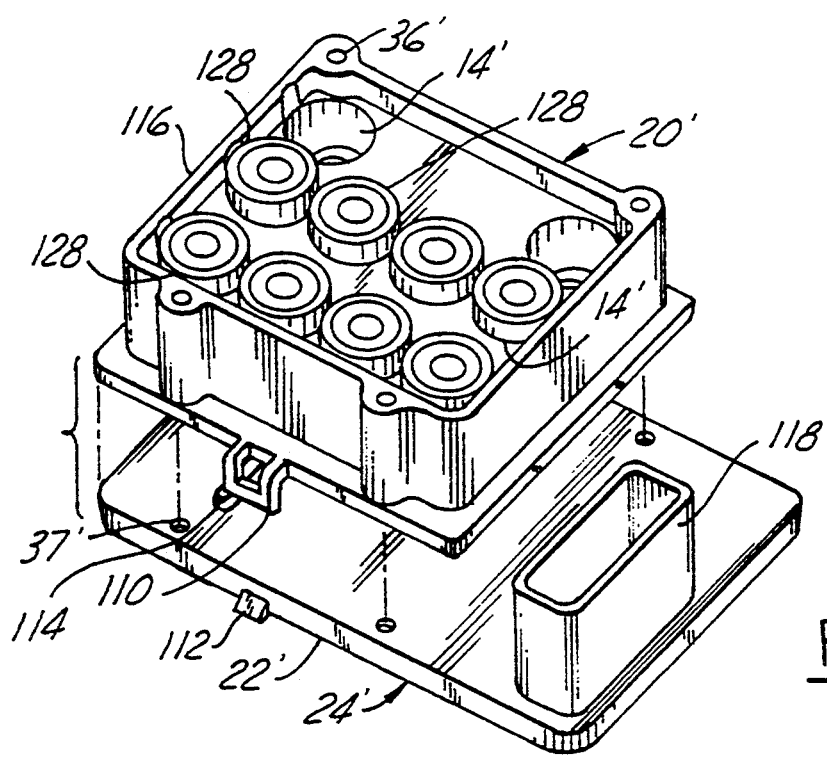
FIG. 8 is a partially exploded perspective view similar to FIG. 1 showing a second alternate embodiment.
Figure 9:
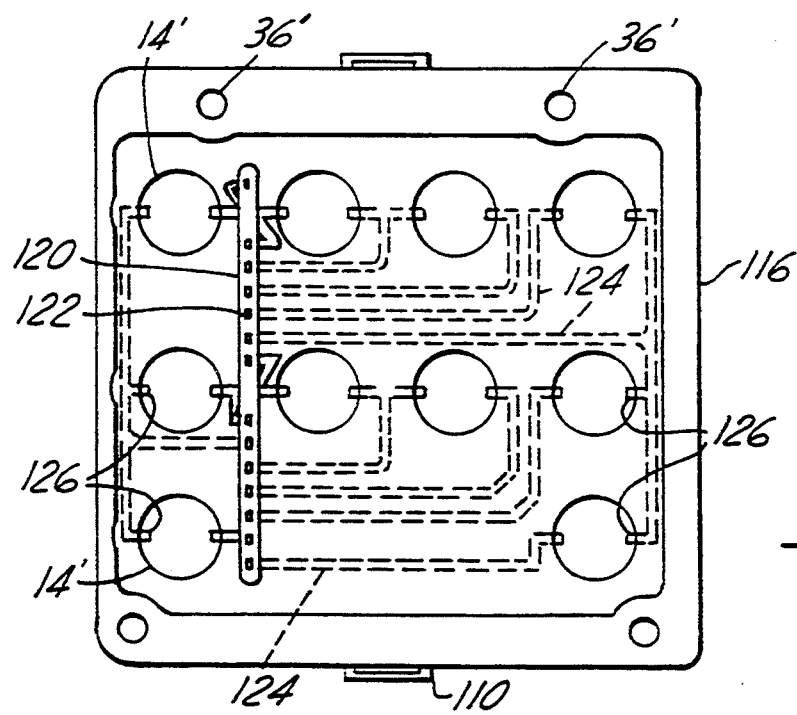
FIG. 9 is a bottom plan view similar to FIG. 2, showing the second alternate embodiment.
Figure 10:
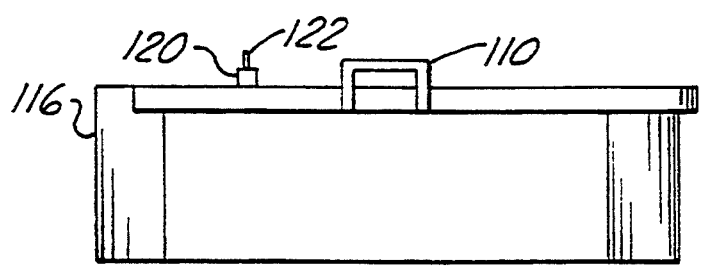
FIG. 10 is a side view similar to FIG. 3, showing the second alternate embodiment.
Figure 11:
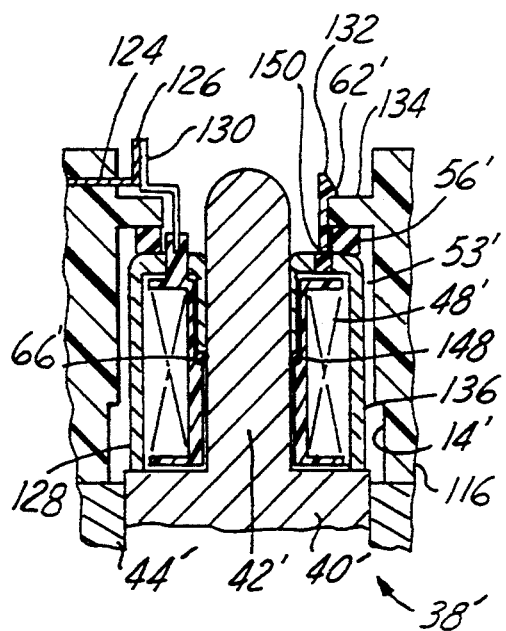
FIG. 11 is a sectional view similar to FIG. 4, showing the second alternate embodiment.

FIG. 6 shows a perspective view of a first alternate embodiment of a solenoid assembly 80, and FIG. 7 shows a cross-sectional view of this first alternate embodiment. For purposes of the description of the later embodiments, elements in these embodiments that have counterpart elements in the first embodiment have been identified by the same reference numerals, although a prime has been added.

Can 52' contains bobbin 46' and coil windings 48' therein. Bobbin 46' has two solderable leads 82 that extend out through can 52'. Solderable leads 82 connect to corresponding holes 84 in circuit board 86 and are soldered in place during assembly of coil pack assembly 88 to the circuitry. A curved compliant bend 90 is put into each coil lead 82 to take up any resulting force when solenoid assembly 80 is held against valve 40' by elastomeric gasket 92, which serves the same purpose as in the first embodiment. This takes the stress out of the solder joint where coil leads 82 are soldered into circuit board 86.

Retention ring 94 mounts to can 52' and includes retention snaps 96 protruding therefrom. Retention ring 94 also includes a solenoid cap 98 that seals around valve stem 42'. Solenoid cap 98 is used in place of 0-ring 66, shown in FIG. 4 in the first embodiment, to seal and prevent contaminants from entering the electronics along valve stem 42'. Guide rails 100 are formed as part of retention ring 94 in order to assist in orienting each solenoid assembly 80 when assembling it into housing 102. Housing 102 has corresponding slots, not shown, in each throughbore 104 for mating with guide rails 100 and aligning solenoid assemblies 80 properly. Solenoid assemblies 80 are held in place by retention snaps 96, latching onto retention walls 64 in housing 102, which allows for repairability as in the first embodiment.

FIGS. 8-11 show a second alternate embodiment of the present invention. In this embodiment, coil pack connector 114 is not integral with main module connector 118, but instead is located directly under coil pack housing 116. Blade connector 120 protrudes out from the bottom of coil pack housing 116, instead of protruding from the side of housing 116, and aligns with coil pack connector 114 when mounted on circuit board 24'. Pins 122 are received within coil pack connector 114 when mounted. Snap retainers 110, protrude from housing 116, and each forms a catch to engage protrusions 112 on circuit board 24', in order to securely mount coil pack assembly 20' securely to circuit board 24'. Leadframes 124 are molded into housing 116, and arranged and shaped so that a pair of contact points 126 protrude into each cylindrical throughbore 14'. The opposite end of leadframes 124 are electrically connected to blade connector 120.

Contact points 126 mate up with solenoid lead wires 130 when solenoid assemblies 128 are mounted in housing 116. This electrically connects leadframes 124 to solenoid assemblies 128. Lead wires 130 electrically connect to coil windings 48' and are supported by bobbin 148, that protrudes through coil can 136 at the locations where it supports lead wires 130. Retention ring 150 is only as wide as retention snaps 132 and it is created while overmolding solenoid assembly 128. Barbs 62' engage retention wall 134 and maintain a compression force on elastomeric gasket 56', which is mounted between retention wall 134 and coil can 136.

Figure 12:
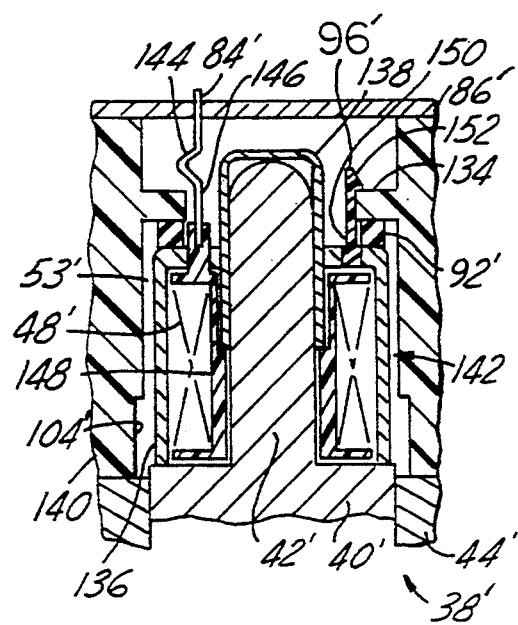
FIG. 12 is a cross-sectional view similar to FIG. 7, showing a third alternate embodiment.

FIG. 12 shows a third alternate embodiment of the present invention. Solenoid cap 138 is not integral with retention ring 150. It has a generally cylindrical shape with a flat top and is sized to slide snugly over valve stem 42' in order to seal along valve stem 42' and prevent contaminants from sliding down along valve stem 42' and onto circuit board 86'. Compliant bends 144 in solderable leads 146 are V-shaped in order to provide some give along the leads, similar to the curved compliant bends 90, shown in FIG. 7. Solderable leads 146 are supported by bobbin 148, that protrudes through coil can 136. Retention wall 134, protruding from housing 140, is engaged by barbs 152 and maintains a compressive force on gasket 92', which is mounted between retention wall 134 and coil can 136 in order to hold solenoid assembly 142 in place.

While certain embodiments of the present invention have been described in detail, those familiar with the art to which this invention relates will recognize various alternative designs and embodiments for practicing the invention as defined by the following claims.

We claim:

1. A solenoid assembly coil pack for use in integrated electronics and hydraulics assemblies of an automotive antilock brake system comprising:
    a coil pack housing provided with a plurality of generally cylindrical bores therethrough and attachment means for securing the coil pack to the electronics assembly, with each bore including a solenoid retaining member;
    a plurality of solenoid assemblies, each adapted to receive a respective valve and valve stem of the hydraulics assembly and each received within a corresponding one of the cylindrical bores, each solenoid assembly including a pair of solenoid lead wires protruding therefrom;
    a plurality of retention rings, with one of the rings cooperatively engaging each of the solenoid assemblies, and with each retention ring including retention means for removably engaging the retaining member to removably retain its corresponding solenoid assembly therein;
    a plurality of gaskets, with one of the gaskets mounted between each of the coil pack housings and its corresponding solenoid assembly;
    sealing means adapted for sealing between each solenoid assembly and associated valve stem of the hydraulics assembly; and electrical means for electrically connecting each of the solenoid lead wires of the solenoid assemblies to the electronics assembly.

2. A solenoid assembly coil pack according to claim 1 wherein the electrical means comprises a plurality of leadframes mounted within the housing in contact with the solenoid lead wires, and a blade connector affixed to the housing and electrically connected between the electronics assembly and the leadframes.

3. A solenoid assembly coil pack according to claim 2 wherein the leadframes are integrally molded into the housing.

4. A solenoid assembly coil pack according to claim 1 wherein the attachment means further provides means for removing the coil pack from and re-securing it to the electronics assembly.

5. A solenoid assembly coil pack according to claim 1 wherein each solenoid assembly further comprises a bobbin having coil windings thereabout and mounted within a coil can, with the bobbin and coil can including a bore forming a cylindrical cavity adapted for receiving the valve stem of the hydraulic assembly.

6. A solenoid assembly coil pack according to claim 5 wherein the sealing means comprises a plurality of O-rings, with one of the O-rings mounted within each of the cylindrical cavities and adapted to sealingly engage about the associated valve stem of the hydraulics assembly.

7. A solenoid assembly coil pack according to claim 5 wherein each coil can is provided with guide rails that are received within its respective cylindrical bore for alignment of each of the solenoid assemblies relative to the coil pack housing.

8. A solenoid assembly coil pack according to claim 1 wherein the sealing means comprises a plurality of solenoid cap members, with one of the cap members affixed to each retention ring and adapted to sealingly surround an associated valve stem of the hydraulics assembly.

9. A solenoid assembly coil pack according to claim 1 wherein a gap is provided between each solenoid assembly and its corresponding cylindrical bore thereby adapted to allow for alignment of each of the solenoid assemblies with its associated valve stem of the hydraulic assembly.

10. A solenoid assembly coil pack according to claim 1 wherein the retention means of the retention rings comprise a plurality of retention snaps, at least one protruding from each retention ring, with each retention snap including a barb protruding therefrom for engagement with its associated solenoid retaining member.

11. An integrated solenoid system for an automotive antilock brake system comprising:
an electronics assembly including a circuit board and a connector mounted thereon;
a hydraulics assembly including a plurality of valves, each of the valves having a valve stem protruding therefrom;
a coil pack housing provided with a plurality of generally cylindrical bores therethrough and attachment means for securing the coil pack to the circuit board, with each bore including a solenoid retaining member;
a plurality of solenoid assemblies, each received within a corresponding one of the cylindrical bores and mounted about a corresponding valve stem, each solenoid assembly including a pair of solenoid lead wires protruding therefrom;
a plurality of retention rings, with one of the rings cooperatively engaging each of the solenoid assemblies, and with each retention ring including at least one retention snap protruding therefrom, with each retention snap including a barb protruding therefrom for engagement with the solenoid retaining member in each bore in the coil pack housing for removably engaging the retaining member to removably retain the corresponding solenoid assembly therein;
a plurality of gaskets, with one of the gaskets mounted between each of the coil pack housings and its corresponding solenoid assembly;
sealing means secured between each solenoid assembly and associated valve stem; and
electric means for electrically connecting each of the solenoid lead wires to the connector of the electric assembly.

12. An integrated solenoid system according to claim 11 wherein the electrical means comprises a plurality of leadframes mounted within the housing and in contact with the solenoid lead wires, and a blade connector, affixed to the housing, electrically connected to the leadframes and mated electrically to the connector mounted on the circuit board.

13. An integrated solenoid system according to claim 12 wherein each solenoid assembly further comprises a bobbin having coil windings thereabout and mounted within a coil can, with each bobbin and coil can including a bore forming a cylindrical cavity that receives its associated valve stem.

14. An integrated solenoid system according to claim 13 wherein the sealing means comprises a plurality of O-rings, with one of the O-rings mounted within each of the cylindrical cavities and sealingly engaged about its associated valve stem.

15. An integrated solenoid system according to claim 14 wherein a gap is provided between each of the solenoid assemblies and its corresponding cylindrical bore to thereby account for tolerances during alignment of each of the solenoid assemblies with its associated valve stem.

16. An integrated solenoid system for an automotive antilock brake system comprising:
an electronics assembly including a circuit board and a connector mounted thereon;
a hydraulics assembly including a plurality of valves, each of the valves having a valve stem protruding therefrom;
a coil pack housing provided with a plurality of generally cylindrical bores therethrough and attachment means for securing the coil pack to the circuit board, with each bore including a solenoid retaining member;
a plurality of solenoid assemblies, each received within a corresponding one of the cylindrical bores such that an alignment gap is formed between each cylindrical bore and its associated solenoid assembly, with each solenoid assembly mounted about a corresponding valve stem and including a pair of solenoid lead wires protruding therefrom;
a plurality of retention rings, with one of the rings cooperatively engaging each of the solenoid assemblies, and with each retention ring including at least one retention snap protruding therefrom, with each retention snap including a barb protruding therefrom for engagement with the solenoid retaining member in each bore in the coil pack housing for removably engaging the retaining member to removably retain the corresponding solenoid assembly therein;

a plurality of gaskets, with one of the gaskets mounted between each of the coil pack housings and its corresponding solenoid assembly;

sealing means secured between each solenoid assembly and associated valve stem; and a plurality of leadframes mounted within the housing and in contact with the solenoid lead wires;

a blade connector, affixed to the housing, electrically connected to the leadframes and mated electrically to the connector mounted on the circuit board.

17. An integrated solenoid system according to claim 16 wherein each solenoid assembly further comprises a bobbin having coil windings thereabout and mounted within a coil can, with each bobbin and coil can including a bore forming a cylindrical cavity that receives its associated valve stem.

18. An integrated solenoid system according to claim 17 wherein the sealing means comprises a plurality of O-rings, with one of the O-rings mounted within each of the cylindrical cavities and sealingly engaged about its associated valve stem.

19. An integrated solenoid system according to claim 17 wherein each coil can is provided with guide rails that are received within its respective cylindrical bore for alignment of each of the solenoid assemblies relative to the coil pack housing.

* * * * *